US012657154B1

(12) United States Patent     (10) Patent No.:   US 12,657,154 B1

West et al.     (45) Date of Patent:     Jun. 16, 2026

(54) UNIFIED MULTI-PROTOCOL VEHICLE BUS NETWORK AND METHOD OF OPERATION

(71) Applicant: Drako Motors, Inc., Austin, TX (US)

(72) Inventors: Richard West, Austin, TX (US); Shivinder Singh Sikand, Austin, TX (US)

( * ) Notice: Subject to any disclaimer, the term of this patent is extended or adjusted under 35 U.S.C. 154(b) by 0 days.

(21) Appl. No.: 18/512,020

(22) Filed: Nov. 17, 2023

Related U.S. Application Data

(60) Provisional application No. 63/501,823, filed on May 12, 2023.

(51) Int. Cl.
    *G06F 13/42*       (2006.01)
    *G06F 13/38*       (2006.01)

(52) U.S. Cl.
    CPC ........ *G06F 13/4282* (2013.01); *G06F 13/382* (2013.01); *G06F 2213/0042* (2013.01)

(58) Field of Classification Search
    CPC ..................................................... G06Q 30/06
    See application file for complete search history.

(56) References Cited

U.S. PATENT DOCUMENTS

| | | | | |
|---|---|---|---|---|
| 5,551,048 | A * | 8/1996 | Steely, Jr. ........... | G06F 12/0815 |
| 8,571,044 | B2 * | 10/2013 | Ihle ......................... | H04L 12/46 |
| | | | | 710/316 |
| 9,804,979 | B2 * | 10/2017 | Sinclair ............... | G06F 12/0246 |
| 2005/0222720 | A1 * | 10/2005 | Flick ...................... | B60R 25/00 |
| | | | | 701/1 |

* cited by examiner

*Primary Examiner* — Henry Tsai
*Assistant Examiner* — Juanito C Borromeo

(57) ABSTRACT

A latency policy-driven serial bus interconnect for vehicle internal communications system includes a conventional Universal Serial Bus (USB) standard cable which couples a plurality of peripheral devices to a vehicle-bus host. In embodiments, the system includes vehicle-bus hubs between the vehicle-bus devices and the vehicle-bus host. The method of operation includes guaranteeing policy-driven latency and bandwidth between each pair of endpoints within the vehicle-bus devices and the vehicle-bus host. The vehicle-bus host includes a multi-port packet payload store and a plurality of processor cores which accommodate real-time and non-real-time components of a vehicle operating system. The system includes hardware virtualization for real-time temporal and spatial isolation of mixed criticality services. Parallel but inter-conscious processes enable connection of endpoints without contention, dynamic packing of micro-frames to achieve bandwidth guarantees, and convergence of pseudo-random coupling to endpoints toward latency service level policies. An RTOS task manages command, event, and transfer rings.

15 Claims, 15 Drawing Sheets

Figure 4:
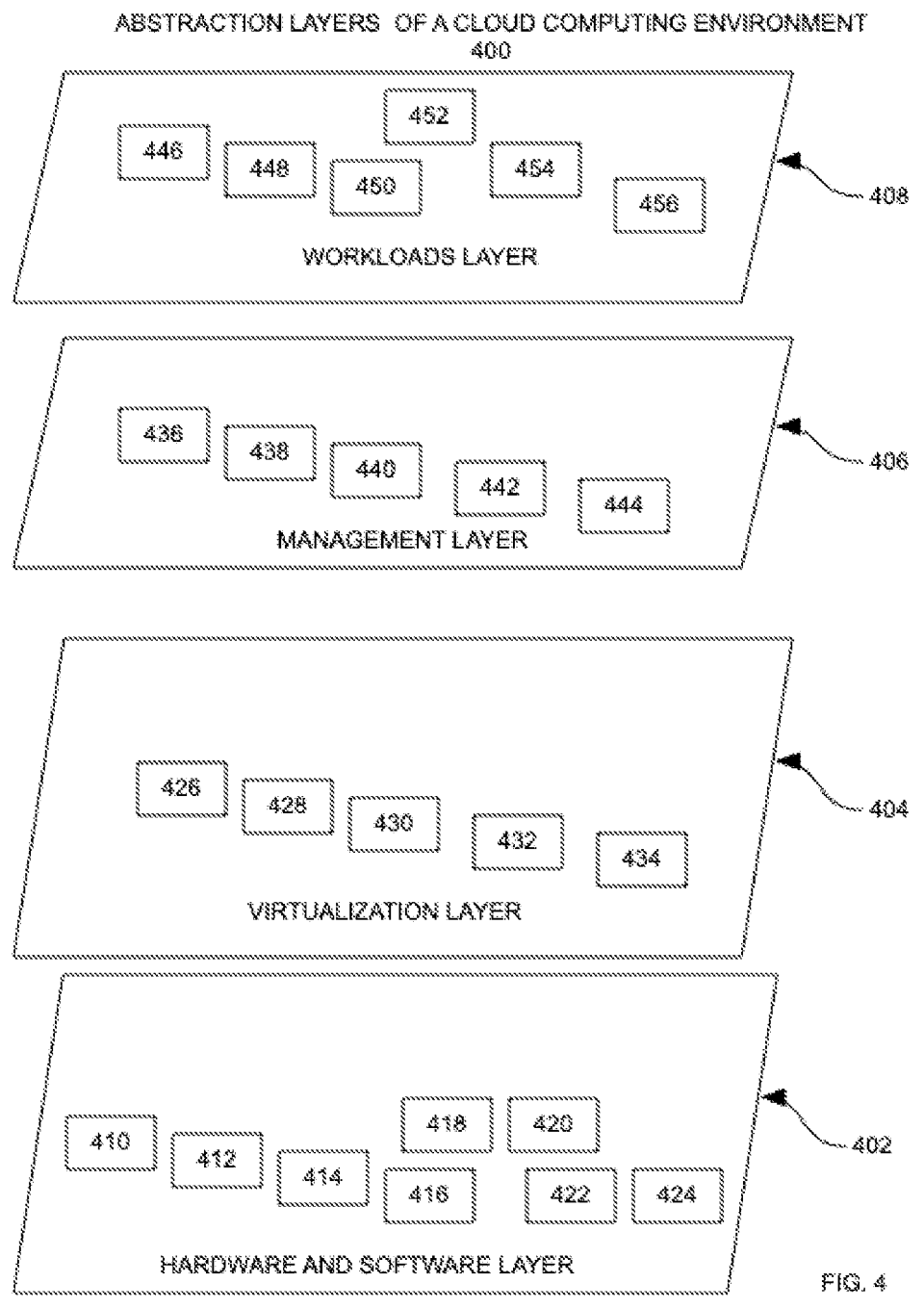

ABSTRACTION LAYERS OF A CLOUD COMPUTING ENVIRONMENT
400

452

446   448   450   454

456                                                    408

WORKLOADS LAYER 436   438   440   442   444                            406

MANAGEMENT LAYER 426   428   430   432   434                            404

VIRTUALIZATION LAYER 418   420

410   412   414   416   422   424                      402

HARDWARE AND SOFTWARE LAYER

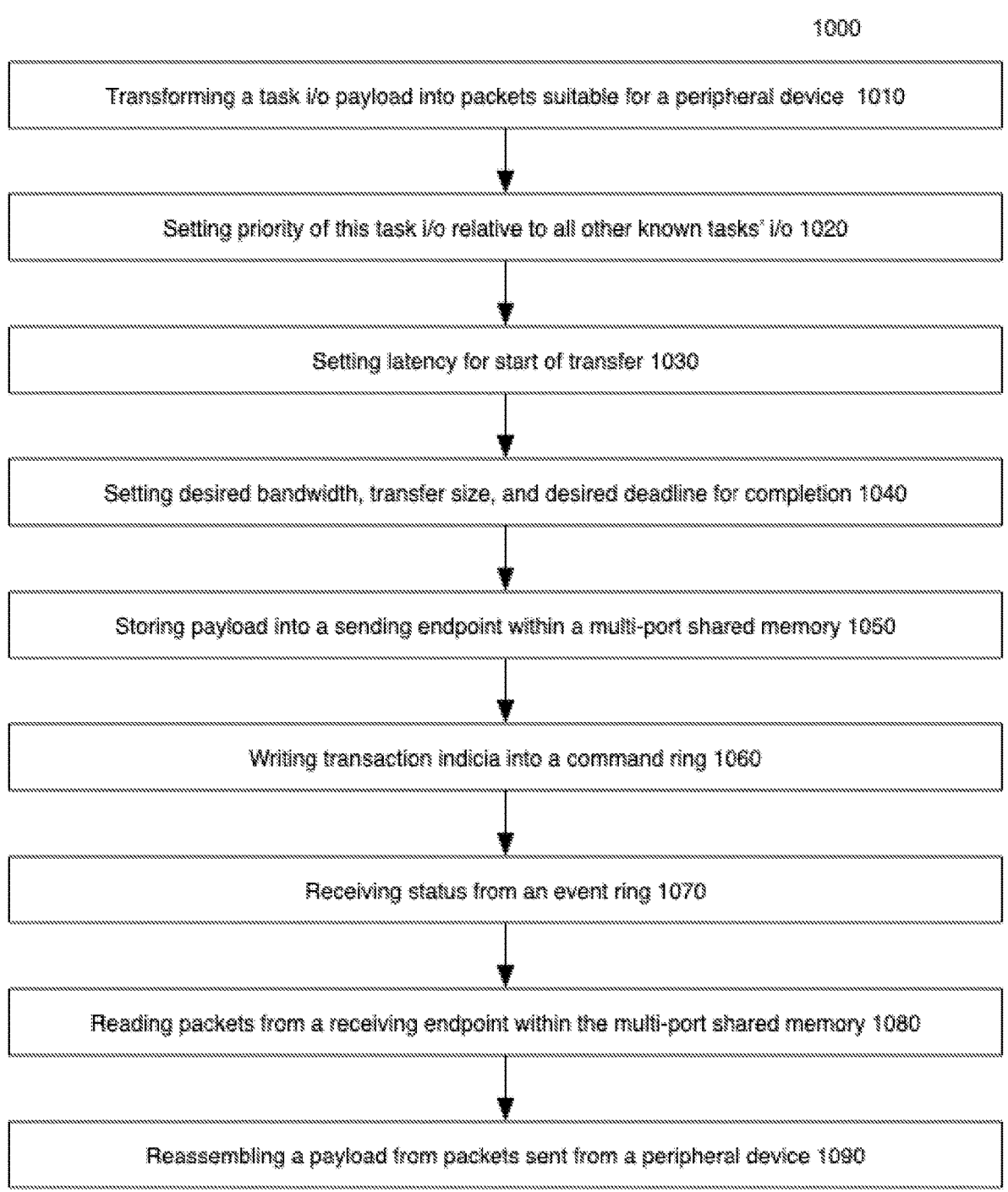

Transforming a task i/o payload into packets suitable for a peripheral device  1010

Setting priority of this task i/o relative to all other known tasks' i/o 1020

Setting latency for start of transfer 1030

Setting desired bandwidth, transfer size, and desired deadline for completion 1040

Storing payload into a sending endpoint within a multi-port shared memory 1050

Writing transaction indicia into a command ring 1060

Receiving status from an event ring 1070

Reading packets from a receiving endpoint within the multi-port shared memory 1080

Reassembling a payload from packets sent from a peripheral device 1090

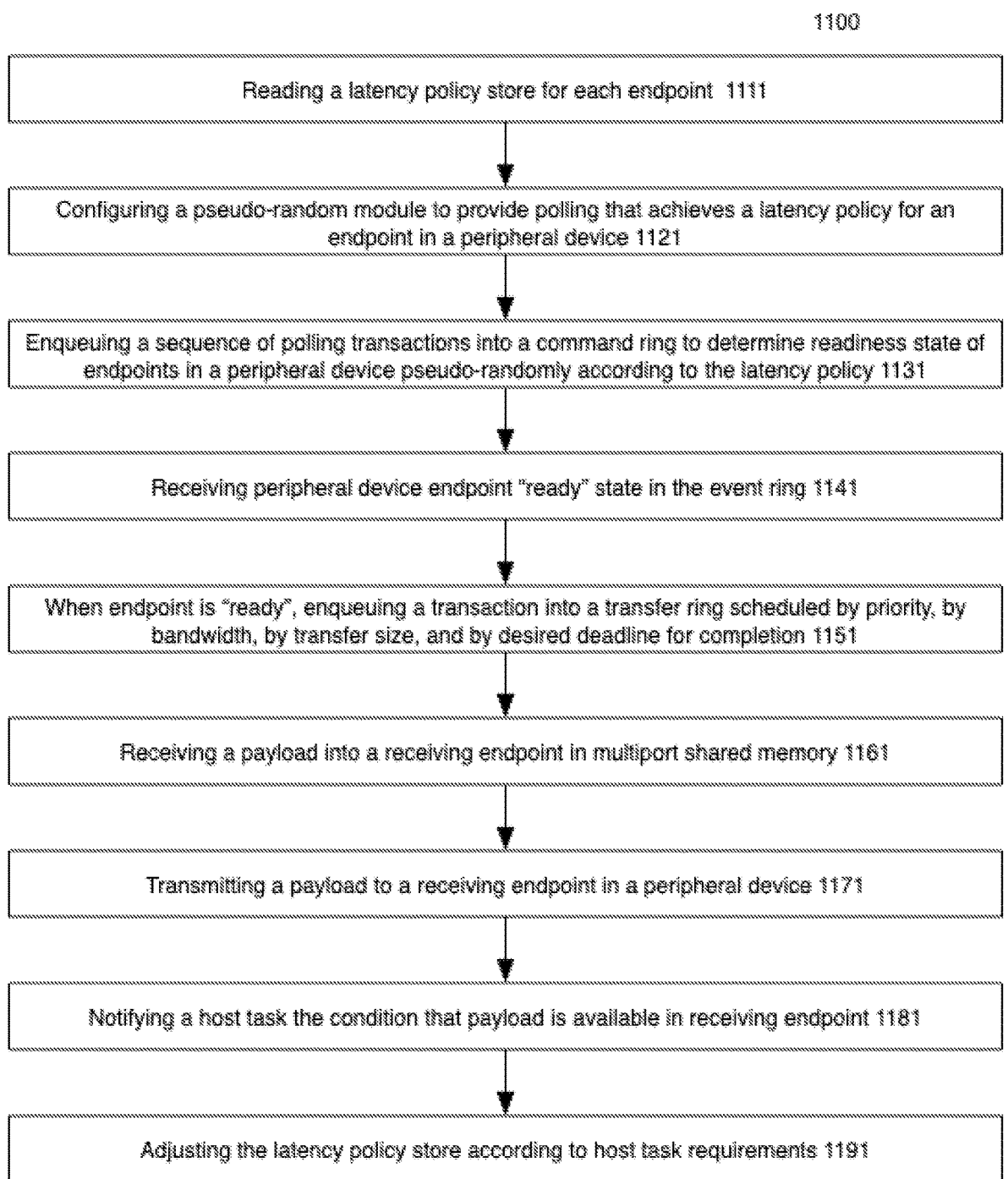

Reading a latency policy store for each endpoint  1111

Configuring a pseudo-random module to provide polling that achieves a latency policy for an endpoint in a peripheral device 1121

Enqueuing a sequence of polling transactions into a command ring to determine readiness state of endpoints in a peripheral device pseudo-randomly according to the latency policy 1131

Receiving peripheral device endpoint "ready" state in the event ring 1141

When endpoint is "ready", enqueuing a transaction into a transfer ring scheduled by priority, by bandwidth, by transfer size, and by desired deadline for completion 1151

Receiving a payload into a receiving endpoint in multiport shared memory 1161

Transmitting a payload to a receiving endpoint in a peripheral device 1171

Notifying a host task the condition that payload is available in receiving endpoint 1181

Adjusting the latency policy store according to host task requirements 1191

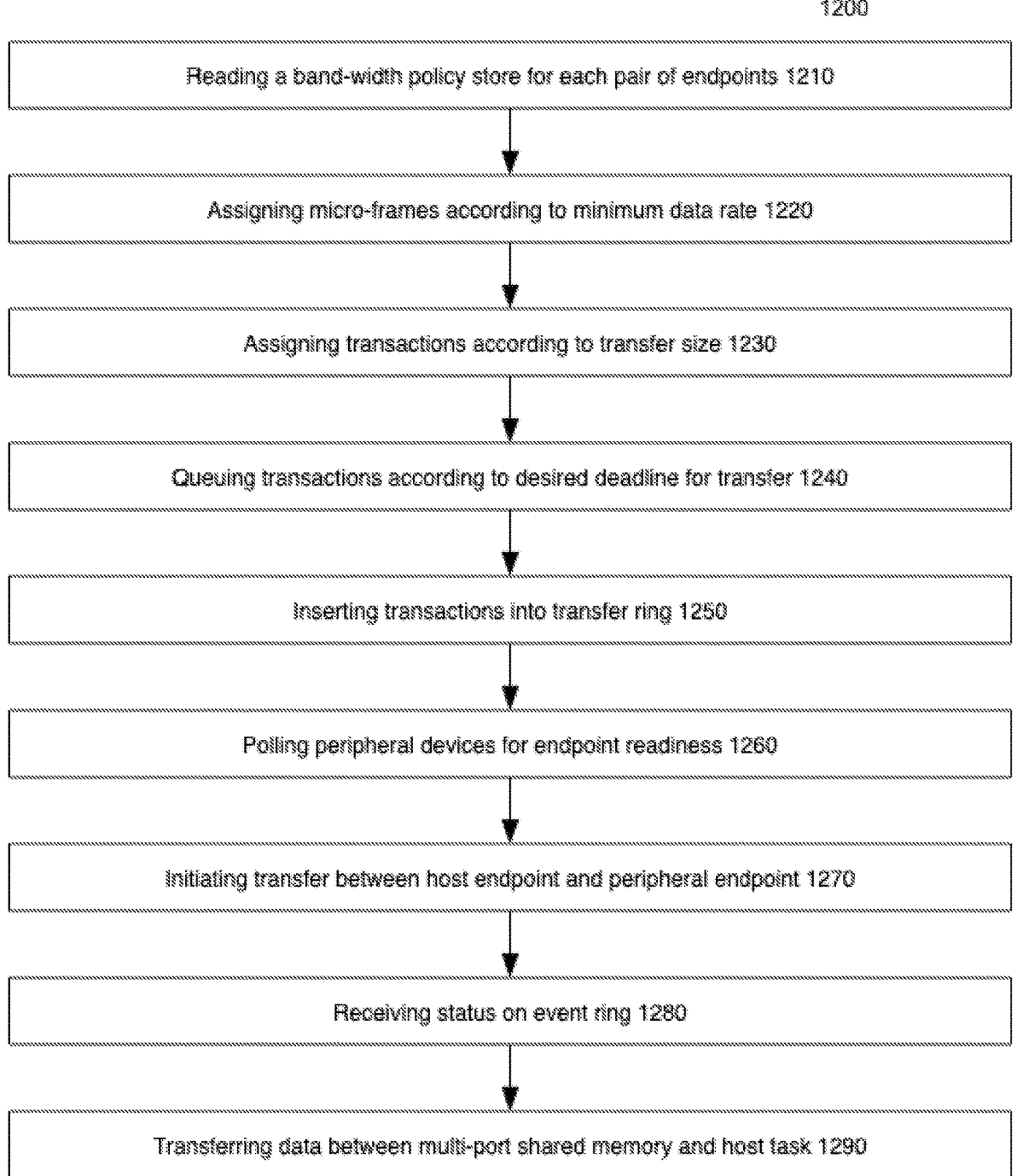

Reading a band-width policy store for each pair of endpoints 1210

Assigning micro-frames according to minimum data rate 1220

Assigning transactions according to transfer size 1230

Queuing transactions according to desired deadline for transfer 1240

Inserting transactions into transfer ring 1250

Polling peripheral devices for endpoint readiness 1260

Initiating transfer between host endpoint and peripheral endpoint 1270

Receiving status on event ring 1280

Transferring data between multi-port shared memory and host task 1290

Computing a hash of a payload 1351

Storing the payload into a content addressable store 1352

Determining when a payload is already in CAS 1353

On the condition that a payload is already in CAS,
Replacing the payload in the sending endpoint with its hash 1354

1400

Storing a hash of malware into a store (malhashstore) 1485

Comparing packets in a receiving endpoint with hashes in the malhashstore 1486

When the condition [content of receiving endpoint equals hash of malware] is TRUE, Disconnecting the peripheral device from the network 1489

1500

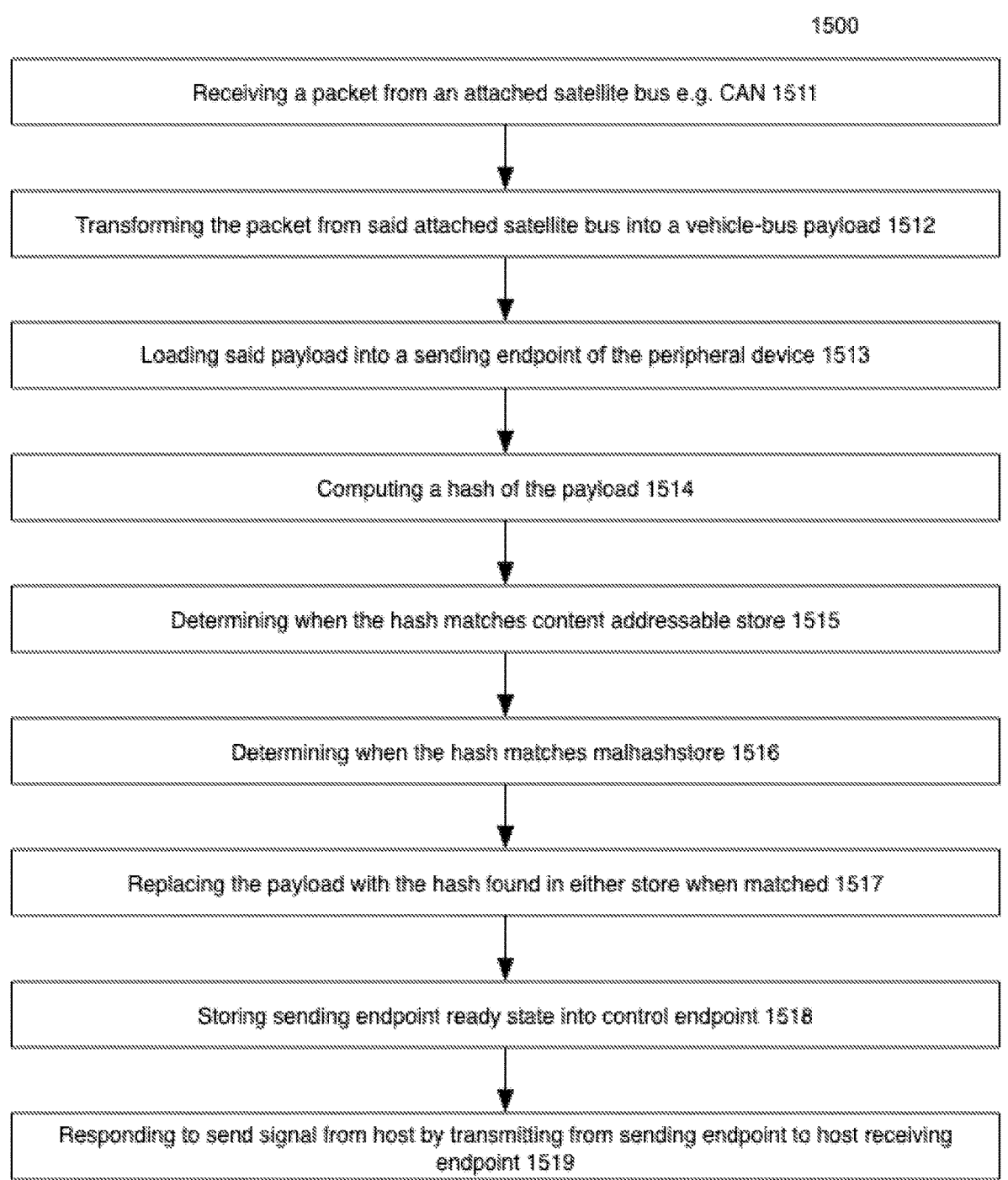

Receiving a packet from an attached satellite bus e.g. CAN 1511

Transforming the packet from said attached satellite bus into a vehicle-bus payload 1512

Loading said payload into a sending endpoint of the peripheral device 1513

Computing a hash of the payload 1514

Determining when the hash matches content addressable store 1515

Determining when the hash matches malhashstore 1516

Replacing the payload with the hash found in either store when matched 1517

Storing sending endpoint ready state into control endpoint 1518

Responding to send signal from host by transmitting from sending endpoint to host receiving endpoint 1519

FIG. 15

UNIFIED MULTI-PROTOCOL VEHICLE BUS NETWORK AND METHOD OF OPERATION

CROSS-REFERENCE TO RELATED APPLICATIONS

The present application is a continuation-in-part application of non-provisional utility application Ser. No. 17/321, 415 "Policy Driven Latency Control Applied To A Vehicular Real Time Network Apparatus" Filing Date May 15, 2021 which issued as U.S. Pat. No. 11,580,060 on Feb. 14, 2023. This non-provisional utility application also benefits from provisional application Ser. No. 63/501,823 filing date May 12, 2023.

PRIOR ART

As is known, attempts to work around low bandwidth legacy vehicle communication buses are expensive and proprietary. The conventional CAN bus architecture is unable to keep up with much higher data transfers and prioritize traffic by its urgency. The expense and complexity of wiring harnesses delays the introduction of new features, capabilities, and model versions. Currently there is no private secure method to protect communications between vehicle subsystems. Removing a headlamp or taillight enables interception of packets and insertion of malicious content.

What is needed is an open architecture for integrating legacy electronic control units and microcontrollers with rapidly evolving autonomous safety and navigation machine learning systems as well as PC operating system applications which need guaranteed latency and bandwidth to sensors and actuators.

BACKGROUND OF THE INVENTION

Vehicles have accreted a lot of wiring for internal controls, head lights, running lights, seat controls, door locks, digital accessories, horns, entertainment, turn signals, windshield wash and wipe, cruise control, mirrors, engine timing, test metrics, heating and air conditioning, trunk release, backup lights, fuel levels, cameras, lidar, tire pressure, airbags, seatbelt interlock, and transmission controls.

Even more are anticipated for drive by wire, autonomous parking and steering, navigation, sensors for collision avoidance, and battery management.

The wiring harness which has all these wires is complex. It needs to provide power and connection to many devices and locations. It is costly to manufacture, complex to design, needs to be specific for each vehicle, and has significant weight.

The present invention relates to automotive electronic control units (ECUs) and real-time networks in vehicle control systems. Additionally, vehicles are becoming more computer like and taking advantage of graphical user interfaces, entertainment, cellular radio, and Global Positioning Satellites.

DESCRIPTION OF THE RELATED ART

CAN bus or Controller Area Network is an industry standard for connecting Electronic Control Units (ECUs) in automobiles.

It is used in practically all vehicles due to low cost, centralized operation, robustness, and efficiency. Communication over the CAN bus is done via CAN frames. USB Universal Serial Bus is a communication standard among computer equipment and inherently has one master unit. Increasingly data must cross the CAN-USB boundary in modern automobiles. Ethernet is a widely understood and adopted networking protocol for Linux and other general purpose operating systems.

As is known, a separation kernel is a collection of distributed components assigned to domains, which appear indistinguishable from separate private machines for each component. As is known, hardware virtualization technologies isolate guest domains in separate sandboxes. A sandbox is an encapsulation of a subset of CPU cores or hardware threads, I/O devices, and regions of physical memory.

Conventional vehicle communications networks have reached an impenetrable frontier. At one industrial tier, well known production standards such as I2C, CAN, LIN, Flexray, and MOST are bandwidth limited, typically below one Megabit per second. At a popular higher tier, Ethernet, suffers from Real-time challenges, jitter, no bandwidth reservation or guarantee. Time-triggered Ethernet is not yet commonplace. Switched architecture is inappropriate in many aspects.

As is known, the major channels of conventional vehicle networks suffer from incompatible goals and history: The Powertrain requires a CAN/Flexray subnet for Transmission, Engine, Battery, and Alternator. The Body & Comfort depends on CAN/LIN for Windows, doors, seats, mirrors, climate, and illumination control. The Chassis/Safety with high reliability/performance needs is hitting the limits of CAN/LIN/Flexray for steering, brakes, tire pressure, and any automation/autonavigation. Finally, the Visualization channel tries to make do with Ethernet/MOST/CAN for instrument cluster, maps, and location, head up display and a head unit. All of which are only integrated for diagnostic analysis of failures or health. There is poor communication both physically and informationally among the four channels. That cannot last. More complexity is on the horizon. New vehicles need to support cameras which require large bandwidth to connect to a centralized compute unit and this further adds to the wiring. A fuse box is also required. Created, resulting in more complexity and weight.

But how can these islands of automation become able to take advantage of multi-core gigahertz system on a chip processors?

Additionally, challenges simultaneously arriving from the horizon add to the communication crisis: connectivity to over-the-air software releases and electric vehicle updates require a new architecture for hardware and software integration; large data transfer, storage, and bandwidth are essential for autonomous driving; the user interface and interactivity from consumer electronics will be baseline expectation; yet custom large semiconductor design cycles or a proliferation of electronic control units become uncompetitive in time to market; conventional methods cannot be extended to support necessary real time operation and security dimensions. OEM and subsystem providers must find a way to design and build concurrently rather than sequentially for rapid evolution and elimination/reduction of cyclical product lives.

What is needed is a system of mixing existing real-time legacy devices and operating systems with non-real-time applications in personal computer platforms without substantial recoding. What is needed is a next generation standard for multi-level critical services and secure isolation with consolidation of engine control unit functions.

SUMMARY OF THE INVENTION

A vehicle-bus network includes a conventional USB standard cable coupling a plurality of vehicle-bus devices to a vehicle-bus host through at least one vehicle-bus hub. The vehicle-bus host includes a multi-port shared memory payload store which presents as the host endpoints in a USB link to peripheral devices.

The invention reduces weight, simplifies the wiring to a single cable, allows reuse in vehicles of different design and simplifies the engineering.

A latency policy-driven serial bus interconnect for vehicle internal communications system includes a conventional Universal Serial Bus (USB) standard cable which couples a plurality of vehicle-bus devices to a vehicle-bus host. In embodiments, the system includes vehicle-bus hubs between the vehicle-bus devices and the vehicle-bus host. The method of operation includes guaranteeing policy-driven latency and bandwidth between each pair of endpoints within the vehicle-bus devices and the vehicle-bus host. The vehicle-bus host includes a multi-port packet payload store and a plurality of processor cores which accommodate real-time and non-real-time components of a vehicle operating system. The system includes hardware virtualization for real-time temporal and spatial isolation of mixed criticality services. Parallel but inter-conscious processes enable connection of endpoints to a multi-port shared memory packet payload store without contention, dynamic packing of pipes to achieve bandwidth guarantees, and convergence of pseudo-random coupling to endpoints toward latency service levels set by policy.

Rather than connecting each switch and each motor, to switches or buttons located on the dashboard or the location to control the item, the invention instead uses a virtualized universal serial bus or equivalent to connect all the devices in a master-slave tree fashion. Advantageously, the power provided using the vehicle bus also electronically eliminates at least one fuse box and the congestion of wires at any fuse box.

Each device in the car is adapted to a USB plug compatible vehicle-bus device. USB plug compatible vehicle bus hubs are used to interconnect the devices. Conventional high-bandwidth USB standard cables are used to connect all the vehicle-bus devices in the car.

For example, the door of the vehicle will have one USB plug compatible vehicle-bus device that will connect the switches in the door, the camera in the door, and the motors for the windows, the door locks. This USB plug compatible vehicle-bus device will have minimal and short wiring in the door, but will only attach to a single USB standard conventional cable that will return to the vehicle-bus host. The single USB standard conventional cable will provide power, receive signals from buttons and switches to send to a central processing unit through a vehicle-bus host, and transport signals from the central processing unit through the vehicle-bus host to control motors, or other mechanical devices.

Legacy CAN-compatible components are coupled by a CAN_to_vehicle-bus converter apparatus which provides protocol conversion, buffers, USB endpoints, power, power storage for burst current operation and content addressable storage for increased effective bandwidth by payload compression.

A minimum number of conventional USB standard cables can be used in the car to connect to each area of the car thereby reducing the cabling and revolutionizing the concept of a wiring harness into a vehicle-bus network. This provides flexibility in that the wiring no longer needs to be completely changed as additional features are added to the car. Additionally, internal vehicle data is not generally accessible on the vehicle-bus network to malicious monitoring of the CAN protocol. Adherence to conventional USB standards for vehicle-bus hosts, vehicle-bus hubs, and vehicle-bus devices makes conventional fuses and fuse-boxes excess and redundant.

BRIEF DESCRIPTION OF DRAWINGS

FIGS. 1-4 disclose an exemplary non-limited computing environment for performance of method processes of the invention, networks, computers, cloud environments, and abstraction layers.

FIG. 10 illustrates embodiments of the invention as method processes performed in a computing environment such as illustrated in FIGS. 1-4.

FIG. 11 is a block diagram of method steps to perform polling according to a latency policy.

FIG. 12 is a block diagram of method steps to perform guaranteeing bandwidth according to a policy.

FIG. 15 is a block diagram of method steps at a peripheral device participating in a multi-protocol vehicle bus system.

The accompanying drawings are not intended to be drawn to scale. Like reference numbers and designations in the various drawings indicate like elements. For purposes of clarity, not every component may be labeled in every drawing. It is appreciated that these drawings depict only typical embodiments of the invention and are therefore not to be considered limiting of its scope.

DETAILED DESCRIPTION OF THE INVENTION

A latency-driven serial bus interconnect for vehicle internal communications system includes a conventional Universal Serial Bus (USB) standard cable which couples a plurality of peripheral devices to a vehicle-bus host. In embodiments the system also includes vehicle-bus hubs which intermediate between the vehicle-bus devices and the vehicle-bus host. The vehicle-bus host includes a multi-port packet shared memory payload store and a plurality of processor cores which accommodate real-time and non-real-time components of a vehicle operating system.

The method of operation includes guaranteeing policy-driven latency and bandwidth between each pair of endpoints within the peripheral devices and the vehicle-bus host according to the requirements of the host tasks. The system includes hardware virtualization for real-time temporal and spatial isolation of mixed criticality services. Parallel but inter-conscious processes enable connection of endpoints to a multi-port packet payload store without contention, dynamic packing of pipes to achieve bandwidth guarantees, and convergence of pseudo-random coupling to endpoints toward latency service levels set by policy.

Figure 5:
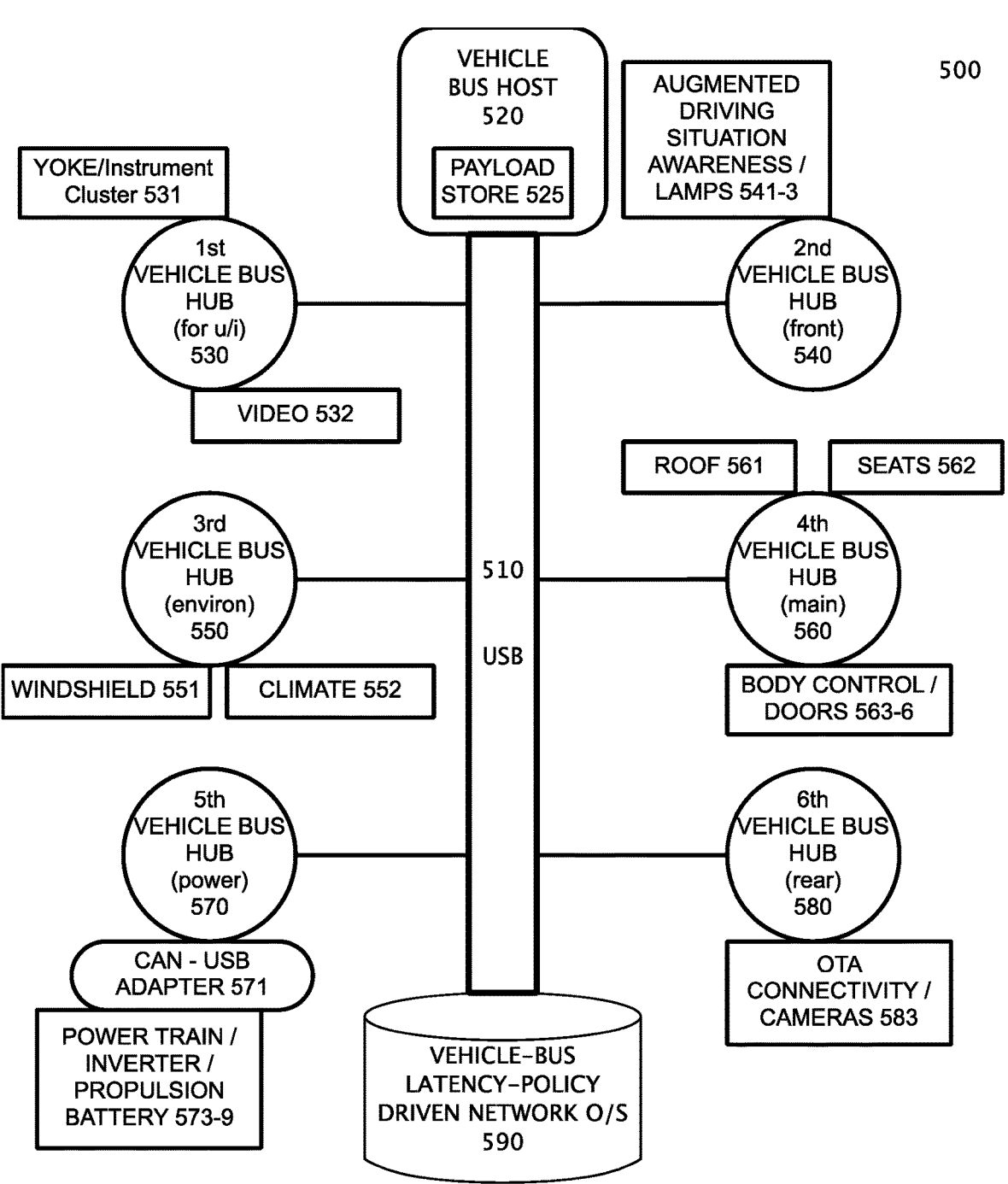
FIG. 5 is an exemplary block diagram of a vehicle-bus network including a conventional Universal Serial Bus cable coupling vehicle-bus hubs to a vehicle-bus host and vehicle bus devices and a CAN-USB adapter coupling legacy power train and propulsion control units.

FIG. 5 illustrates how the invention replaces a wiring harness with one embodiment of a logical and regional vehicle-bus network. A semiconductor system on a chip is coupled to a vehicle-bus network as a vehicle-bus host 520; and includes a payload store 525; Said vehicle-bus network is further coupled to a plurality of vehicle-bus devices 531, 532, 541-3, 551-2, 561-6, 583 through at least one vehicle-bus hub 530-580; and Said vehicle-bus network further coupled to a CAN compatible legacy controller 573-9 through a CAN-USB adapter 571 and operated according to a latency-policy driven operating system 590.

Figure 6:
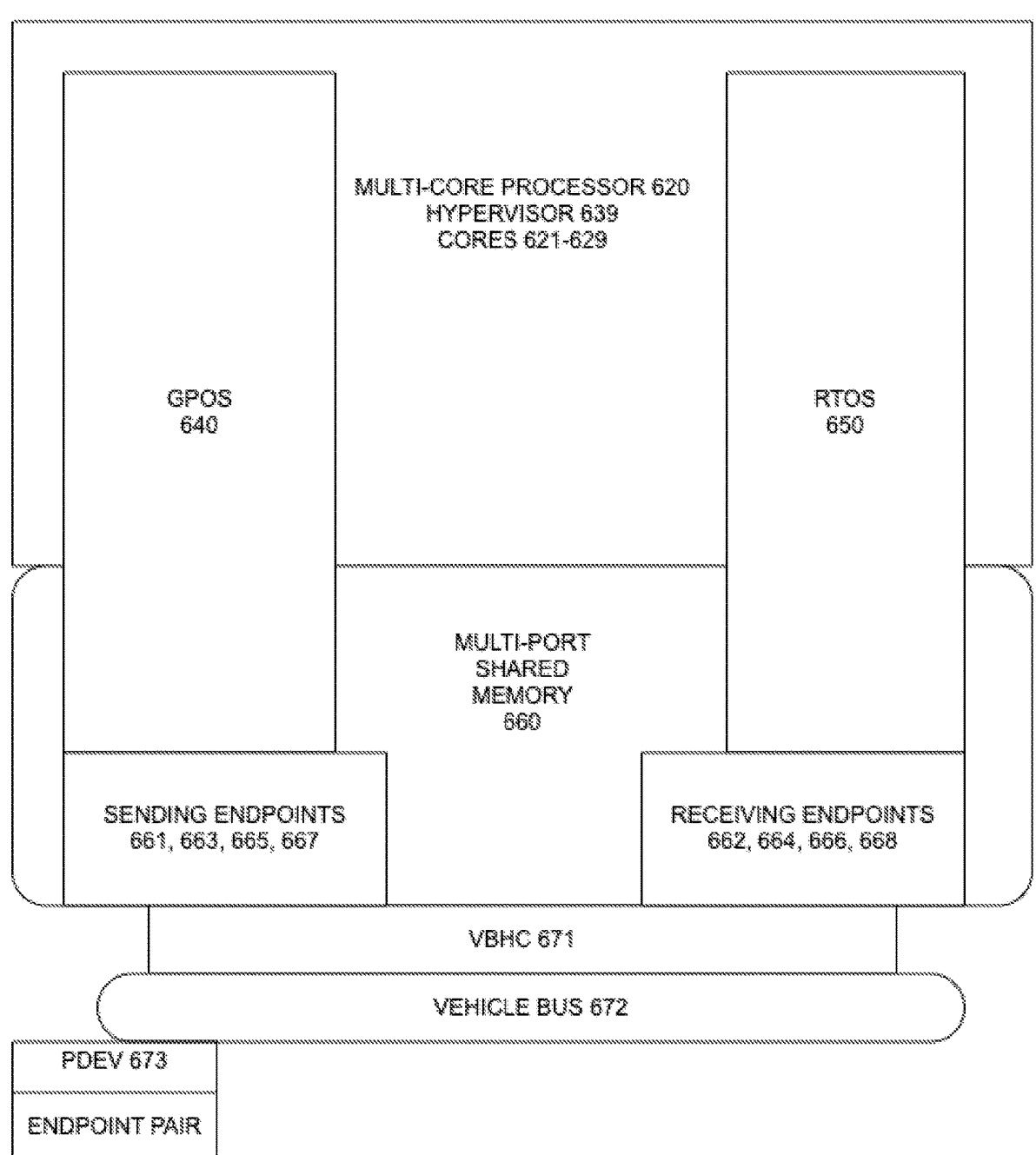
FIG. 6 illustrates a multi-protocol combine real-time and non-real-time vehicle bus system.

Referring Now to FIG. 6, a Multi-Protocol Combined Real-Time and Conventional Vehicle Bus System 600 Includes:

A multi-core processor device 620, managed by
a hypervisor 639, comprising
a plurality of cores 621-629; of which
A processor core configured as a general purpose operating system 640 supporting
A plurality of functional data-driven tasks;
A processor core configured as a real-time operating system 650 supporting
A plurality of real-time, event-driven tasks;
A multi-port shared memory 660 accessible to tasks in a real-time operating system and tasks in a general purpose operating system;
Wherein said multi-port shared memory comprises a plurality of vehicle bus host sending endpoints 661, 663, 665, 667 and a plurality of vehicle bus host receiving endpoints 662, 664, 666, 668;
A vehicle bus host controller (VBHC) 671;
At least one peripheral device (pDev) 673 comprising at least one pair of sending and receiving endpoints;
all coupled to the VBHC 671;
By a multi-wire media (cable) 672.

Figure 7:
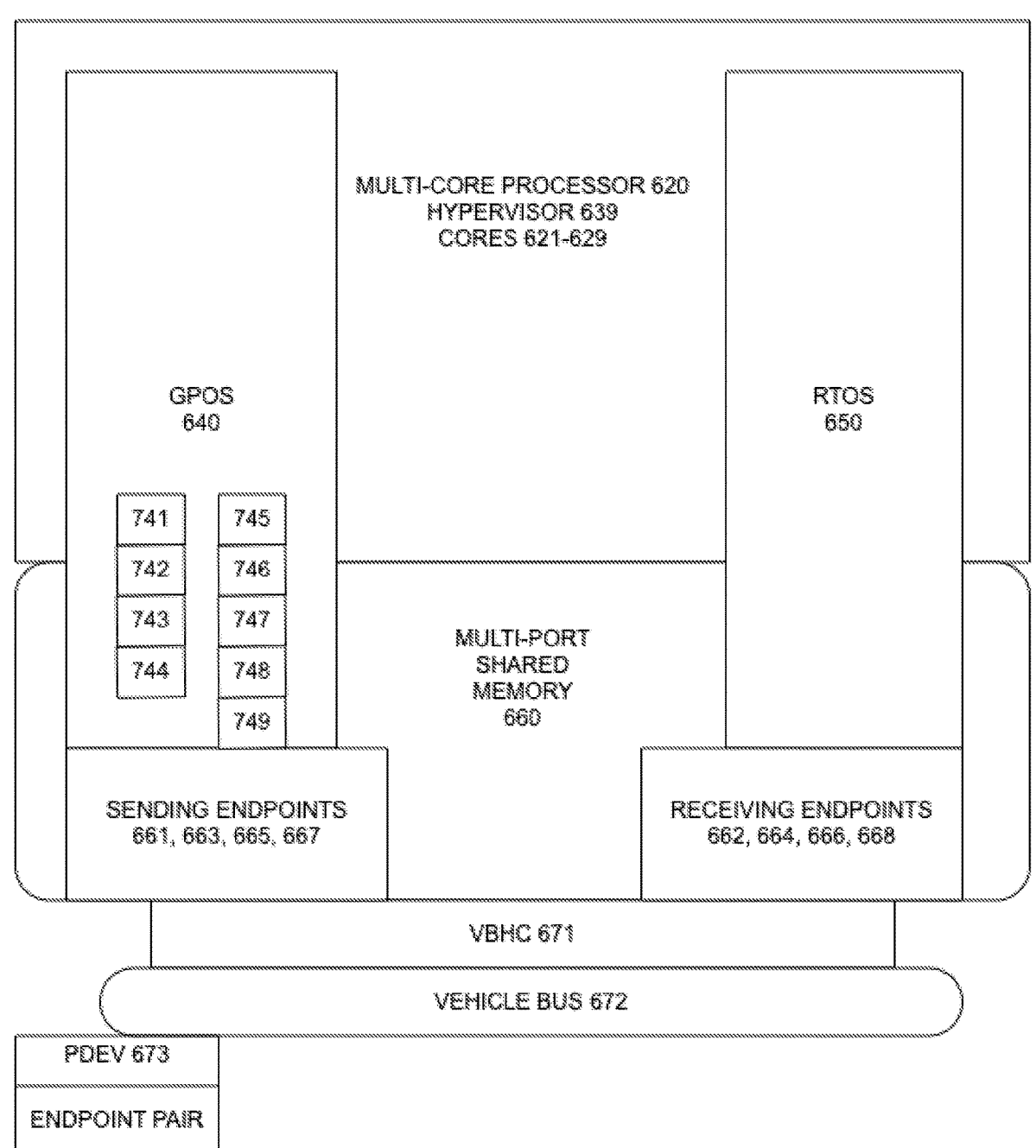
FIG. 7 illustrates tasks hosted by a non-real-time operating system in a virtualized core.

Now Referring to FIG. 7, in an Embodiment, the General Purpose Operating System Core 640 Also Includes:

A plurality of virtual machine hosted tasks 741-42;
A pipeline of payloads and packets queued for bus transfers 743,
A store of latency and bandwidth policies for each pair of endpoints on the vehicle bus 744; and
A store of relative priorities of virtual machine hosted tasks 745.

In Embodiments, the System Also Includes:

at least one of a programmable pseudo-random number generator 746 module to direct endpoint polling according to latency policy set by the task of the host;
A hash function 747;
A Content addressable store 748 and
A malware hash store 749.

Figure 8:
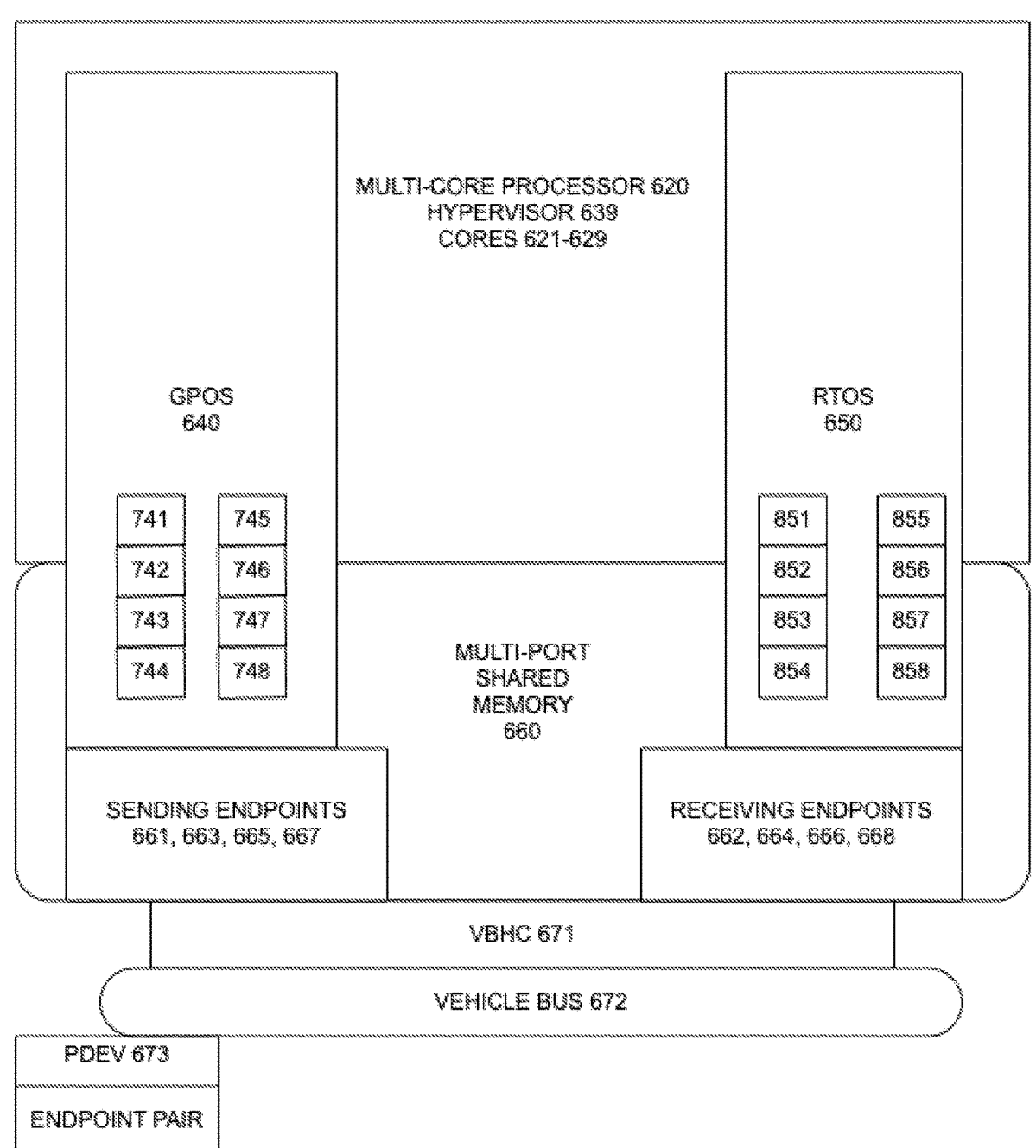
FIG. 8 illustrates tasks hosted by a real-time operating system in a virtualized core.

Referring now to FIG. 8, in an embodiment, the real-time operating system core 650 also includes: command ring task 851; event ring task 852; plurality of transfer ring tasks 853, 855 and 857, and stores 854, 856 and 858 for micro-frame pipes; said micro-frames, event ring 852 and command ring 851 being compatible with USB3 specification published by USB Implementers Forum, Inc.

Figure 9:
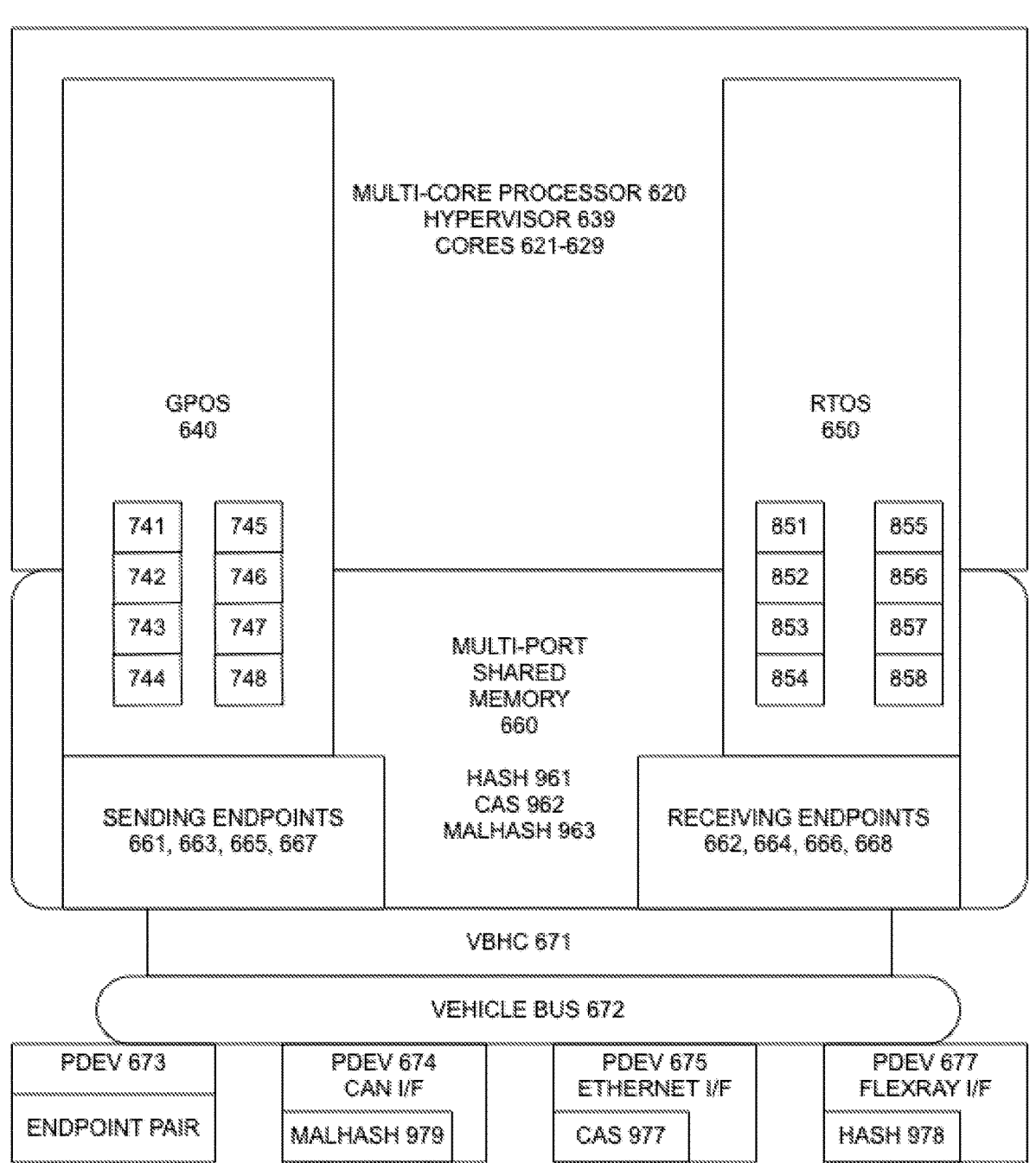
FIG. 9 illustrates an embodiment of a multi-port shared memory accessible to both real-time and non-real-time tasks.

Referring now to FIG. 9, in an embodiment, the multi-port shared memory 660 includes a hash function and store 961, a content addressable store (CAS) 962, a malware hash store 963. In embodiments, peripheral devices 673-677 include bus endpoints, a CAN interface 674, and Ethernet interface 675, a FlexRay interface 677. In embodiments, the peripheral devices also include a hash function 978, a content addressable store 977, and a malware hash store (malhash store) 979.

Another aspect of the invention is a method of operation including: instructions encoded on non-transitory media to cause a processor to perform operations on data in a vehicle bus system.

Embodiments of Methods of the Invention

Referring now to FIG. 10, a method of operation 1000 of a vehicle bus system includes:

At a Host Apparatus,
Transforming a first task i/o payload into packets suitable for a first peripheral device 1010;
Setting priority of this task i/o relative to all other known tasks' i/o 1020;
Setting latency for start of transfer 1030;
Setting desired bandwidth, transfer size, and desired deadline for completion 1040;
Storing payload into a sending endpoint within a multi-port shared memory 1050;
Writing transaction indicia into a command ring 1060;
Receiving status from an event ring 1070;
Reading packets from a receiving endpoint within the multi-port shared memory 1080; and
Reassembling a second task payload from packets sent from a second peripheral device 1090.

Referring Now to FIG. 11, in an Embodiment the Method of Operation 1100 Further Includes:

At a host,
Reading a latency policy from a latency policy store for each endpoint 1111;
Configuring a pseudo-random module to provide polling that achieves a latency policy for an endpoint in a peripheral device 1121;
Enqueuing a sequence of polling transactions into a command ring to determine readiness state of endpoints in a peripheral device pseudo-randomly according to the latency policy 1131;
Receiving peripheral device endpoint "ready" state in the event ring 1141;
When endpoint is "ready", enqueuing a transaction into a transfer ring scheduled by priority, by bandwidth, by transfer size, and by desired deadline for completion 1151;
Receiving a payload into a receiving endpoint in multiport shared memory 1161;
Transmitting a payload to a receiving endpoint in a peripheral device 1171
Notifying a host task the condition that payload is available in receiving endpoint 1181; and
Adjusting the latency policy store according to host task requirements 1191.

Referring Now to FIG. 12, in an Embodiment, the Method 1200 Also Includes:

At a Host,
Reading a band-width policy store for each pair of endpoints 1210;
Assigning micro-frames according to minimum data rate 1220;
Assigning transactions according to transfer size 1230;
Queuing transactions according to desired deadline for transfer 1240;
Inserting transactions into transfer ring 1250;
Polling peripheral devices for endpoint readiness 1260;

Initiating transfer between host endpoint and peripheral endpoint 1270;

Receiving status on event ring 1280; and

Transferring data between multi-port shared memory and host task 1290.

Figure 13:
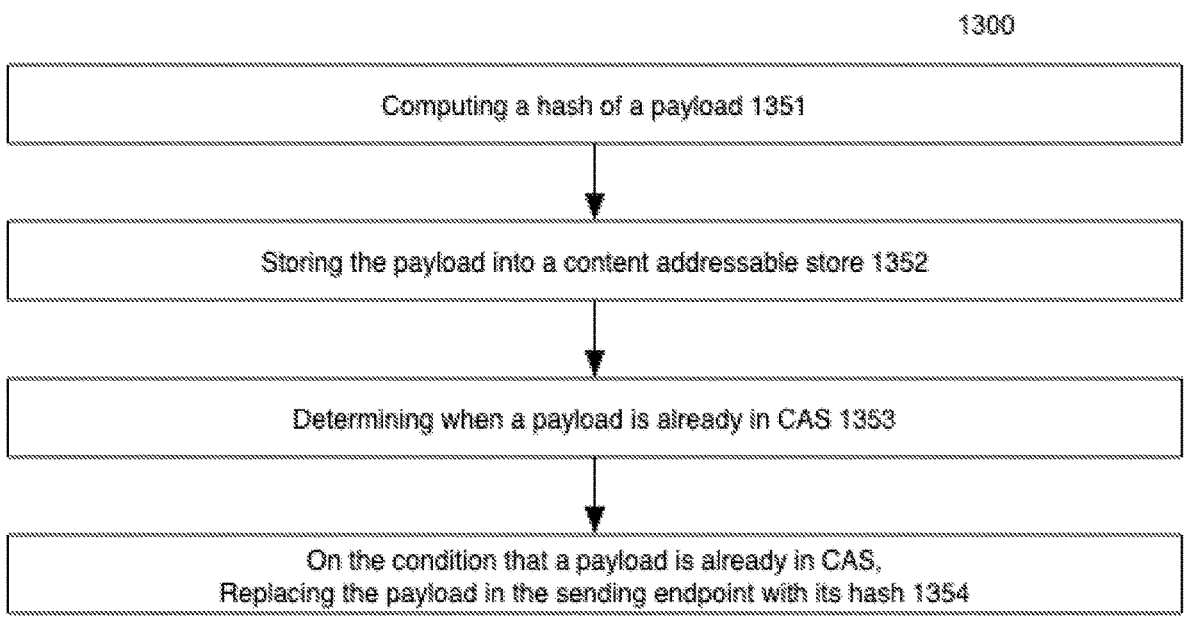
FIG. 13 is a block diagram of method steps for reducing bus traffic by substituting hashes for payloads.

Referring Now to FIG. 13 in an Embodiment, the Method 1300 Further Includes:

Computing a hash of a payload 1351;

Storing the payload into a content addressable store 1352;

Determining when a payload is already in CAS 1353; and

On the condition that a payload is already in CAS,

Replacing the payload in the sending endpoint with its hash 1354.

Figure 14:
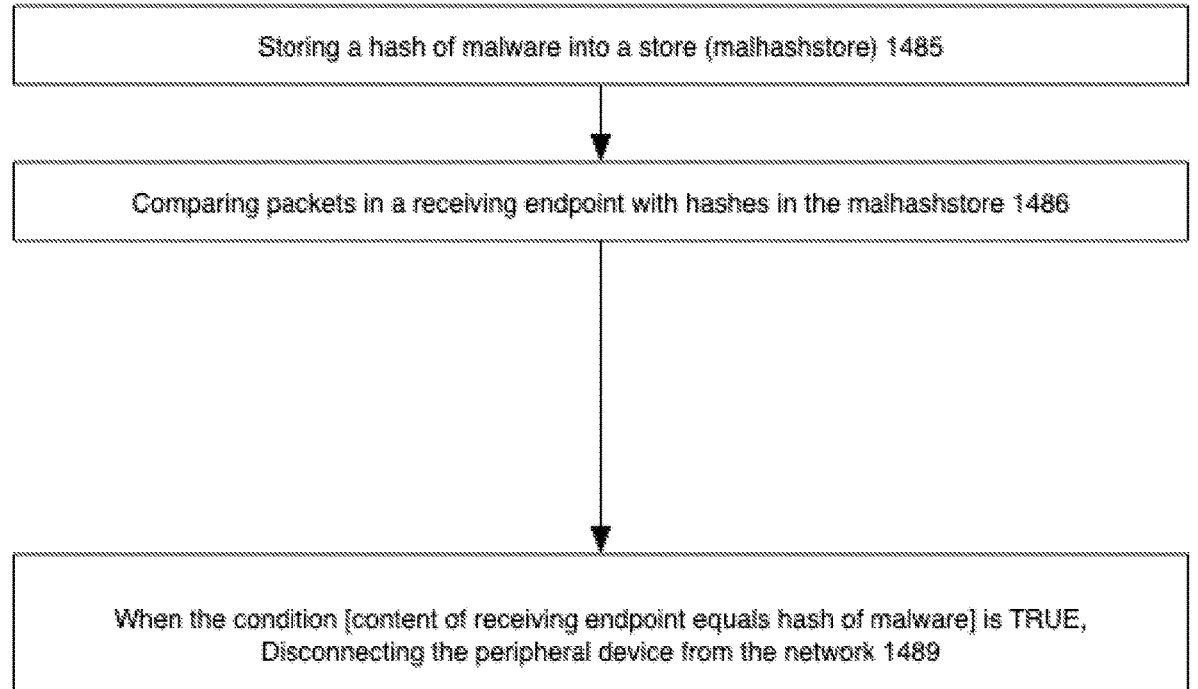
FIG. 14 is a block diagram of method steps for eliminating malware in the vehicle bus system.

Referring Now to FIG. 14, in an Embodiment, the Method 1400 Also Includes:

Storing a hash of malware into a store (malhashstore) 1485;

Comparing packets in a receiving endpoint with hashes in the malhashstore 1486; and When the condition content of receiving endpoint equals hash of malware is TRUE, Disconnecting the peripheral device from the network 1489.

Referring Now to FIG. 15, a Method 1500 at a Peripheral Device Includes:

Receiving a packet from an attached satellite bus e.g. CAN 1511;

Transforming the packet from said attached satellite bus into a vehicle-bus payload 1512;

Loading said payload into a sending endpoint of the peripheral device 1513;

Computing a hash of the payload 1514;

Determining when the hash matches content addressable store 1515;

Determining when the hash matches malhashstore 1516;

Replacing the payload with the hash found in either store when matched 1517;

Storing sending endpoint ready state into control endpoint 1518; and

Responding to send signal from host by transmitting from sending endpoint to host receiving endpoint 1519.

In an embodiment of a door of the vehicle which includes one USB plug compatible vehicle-bus device 563 that will connect the switches in the door, the camera in the door, and the motors for the windows, the door locks. This USB plug compatible vehicle-bus device will have minimal and short wiring interior to the door, but will only attach to a single USB standard conventional cable 510 that will return to the vehicle-bus host through vehicle-bus hub 560. In embodiments, the vehicle-bus hub 560 has stored power for current spikes in powering seats, mirrors, windows, lock actuators, and emergency backup. In embodiments, the vehicle-bus hub 560 has a content addressable store 668 for payload compression from cameras.

In an embodiment a policy guarantees high bandwidth to a camera coupled to a USB standard cable 510 by allocating payloads to a pipe. A USB-standard compatible vehicle-bus device further includes an energy storage apparatus to backup power for emergency shut down and for intermittent load current surges such as when starting motors or actuating switches. Advantageously, a conventional USB standard cable includes an electromagnetic shield to eliminate crosstalk and noise in high data rate transmissions necessary for modern vehicle control. In embodiments, the vehicle-bus connector is an extended range EMI shielded USB compatible connector.

Another aspect of the invention is a high bandwidth USB compatible cable which enables replacement of many localized special purpose dedicated ECUs with a multi-threading higher performance single ECU managing multiple functions using modern hardware virtualization. In an embodiment, a USB-compatible hub directs packets appropriate for each car application and concentrates payloads in a content-addressable store. In an embodiment, a real-time partitioning hypervisor guarantees I/O throughput and delay which creates a virtual real-time USB for vehicle operations with critical ranges of latency and bandwidth. In an embodiment, a plurality of cores are allocated to conduct vehicle control functions within isolated virtual ECUs.

In other embodiments, consumer provided devices connect to a wireless vehicle port through a Bluetooth to USB transceiver coupled to the vehicle-bus network. In an embodiment, a virtualized CPU is dedicated to entertainment software isolation for the vehicle. In an embodiment, a pseudo-random scheduler of a vehicle operating system enables connection into a shared memory architecture for intra-vehicle communication. In an embodiment, a plurality of cores under scheduling control of a hypervisor provides isolation of time critical jobs for automotive control within a ranking hierarchy of source-sink graphs.

Another aspect of the invention is a method embodiment of the invention by quantifying for acceptable confidence of fulfillment for each service graph by at least one of the group: (in non-limiting exemplary embodiments)

starting from least ranked graph to top ranked graph, assigning minimum of each range for bandwidth and minimum of each range of latency to a min table;

starting from top ranked graph to least ranked graph, assigning maximum of each range for bandwidth and maximum of each range of latency to a max table;

converging the min table with the max table by when total available resource exceeds total of min resource, reassign 110% of last min;

when total of max resource exceeds total available resource, reassign 90% of last max;

stop when fulfillment is met for acceptable confidence for all graphs.

Another Aspect of the Invention is a Method Embodiment of the Invention:

enabling multiport storage access without conflict;

pseudo-random coupling multiport payload storage to at least one of each source and at least one of each sink within a confidence range of fulfillment according to coupling indicia (wherein coupling indicia include the size and taps on the pseudo-random function);

packing a queue of payloads into a pipe according to indicia (wherein packing indicia includes the number of payloads queued and the size of each payload);

measuring convergence of latency and bandwidth within a time block toward acceptable ranges of service level;

evolving, within a first time block, pipe packing indicia and pseudo-random coupling indicia to fulfill latency and bandwidth service level ranges on the condition that latency and bandwidth is not converging toward acceptable ranges.

Another aspect of the invention is a vehicle bus system which includes: A plurality of source-sink graphs. In many cases the source-sink graph is just a pair of endpoints. A network architect ranks the relative urgency of serving each graph by assigning a policy.

Within each source-sink graph e.g. an endpoint pair, a process performs fulfillment, that is ensures a distribution of frequencies and quantums data transfer probabilistically/statistically. (within a window, two weeks, two days, two minutes, two seconds, each graph is served according to its assigned policy.)

Two Parallel Processes Operate in Controlling the Vehicle-Bus Network:

Q. a quantum pipeline packer. The quantum pipeline packer process determines a queue of payload contents to meet the required number and size of payloads which is enabled by the quantum policy for each graph or endpoint pair. The pipeline may require multiple packets to transfer or may reference locations of previously transferred payload contents.

R. a pseudo-random payload pointer. The pseudo-random payload pointer process connects an endpoint to an address in the host payload store. The pointer serves the source-sink graphs according to their assigned urgency by a distribution of frequencies. The pointer asynchronously transfers data from source to sink by connecting each to the address in the host payload store within the range of service fulfillment required in the policy.

Each source or sink in the vehicle-bus network has buffers for receiving data sent out from the host payload store and for providing data into the host payload store in addition to standard command and control buffers. Additionally, each source or sink may have content addressable storage and a hash function to determine when repeating data has been previously transmitted. Thus, a payload can be replaced with a sequence of hashes referencing contents previously transmitted or hashes and new or changed content. A vehicle-bus to CAN adapter or a vehicle-bus device may have an energy cache such as a battery or capacity to provide emergency power in the event of a fault or surge current for motors and actuators during startup. Emergency power can be triggered by absence of traffic on the vehicle-bus itself. Surge current can be enabled by a packet directed to open or close windows and doors.

A vehicle-bus hub may have filters to limit the transmission of traffic to addressees. Additionally, each vehicle-bus hub may have content addressable storage and a hash function to determine when repeating data has been previously transmitted. Thus, a payload can be replaced with a sequence of hashes referencing contents previously transmitted or hashes and new or changed content. A vehicle-bus hub may have voltage and current limiters to protect the network from accidental or malicious surges.

The vehicle-bus host payload store is also accessible to legacy software and operating systems which do not participate in the ranked source-sink policy assigned urgency service evaluation. (or their rank is assigned toward the baseline of lowest urgency).

While embodiments of the vehicle-bus system are downwardly compatible with conventional Universal Serial Bus standards electrically, the real-time operations of mixed criticality require the inventive architecture of the vehicle-bus host and the vehicle-bus devices and the method embodiments of the vehicle operating system.

Embodiments of the Invention Enable Advanced Functionality:

Single ECU Car;
Bluetooth-USB interface transceiver;
Cameras over USB for Car;
Real Time USB for Car;
CPU Core Allocation for Vehicle Control;
Entertainment Software Isolation for Car;
USB Hub for car applications;
USB battery/capacitor for current surge on Intermittent Load;

EMI shielding for intra-car communication by USB cables;
EMI shielding for intra-car communication by USB Connector;
Shared Memory Architecture for Car; and
Isolation of Time Critical Jobs for Automotive Control.

CONCLUSION

In conclusion, the invention may be easily distinguished from conventional vehicle wiring systems by transmitting payloads of packets only from a first addressed endpoint to a second addressed endpoint according to ranked urgency. The invention is distinguished by providing guaranteed bandwidth and policy-driven latency service levels for each task. The invention is distinguished by a secure application programming interface (API) with time-limited and bandwidth guaranteed access to network resources. The invention is distinguished by hosting endpoints in a multi-port shared storage device accessible to a plurality of real-time and non-real-time tasks in virtual machines. The invention is distinguished by pseudo-randomly coupling each endpoint to the multi-port shared storage device according toa policy-driven range of latency fulfillment metrics. The invention is distinguished by dynamically packing payloads into a micro-frame to achieve a bandwidth guarantee.

Advantageously, the power provided using the serial bus also electronically eliminates at least one fuse box and the congestion of wires at any fuse box. Advantageously, a single or minimal number of ECUs time-multiplexed over a shielded serial bus substantially reduces electromagnetic interference, noise, cross-talk, and weight.

A vehicle-bus network system is easily distinguished from a conventional Universal Serial Bus apparatus by its vehicle-bus host apparatus and method of operation. The vehicle-bus host apparatus supports mixed criticality transactions by virtualized multi-core hardware and software combining real-time and non-real-time operating system processes. The vehicle-bus host apparatus enables policy-driven latency policy to couple endpoints through a multi-port payload store. The vehicle-bus host method provides guaranteed band-width by dynamically packing its micro-frames to achieve ranked urgency among service levels. The vehicle-bus host method couples endpoints to content addressable store according to acceptable ranges of latency-driven criticality. The vehicle-bus network hubs and devices include hash functions and content addressable stores to compress payloads and improve band-width over conventional USB operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. A computer readable specification may be transformed into a specialized hardware processor such as for determining a hash, or a public-private key pair by a synthesis product configuring an IP core such as an ARM design architecture.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-4, diagrams of data processing environments are provided in which illustrative embodiments may be implemented. It should be appreciated that FIGS. 1-4 are only meant as examples and are not intended to assert or imply any limitation with regard to the environments in which different embodiments may be implemented. Many modifications to the depicted environments may be made.

Figure 1:
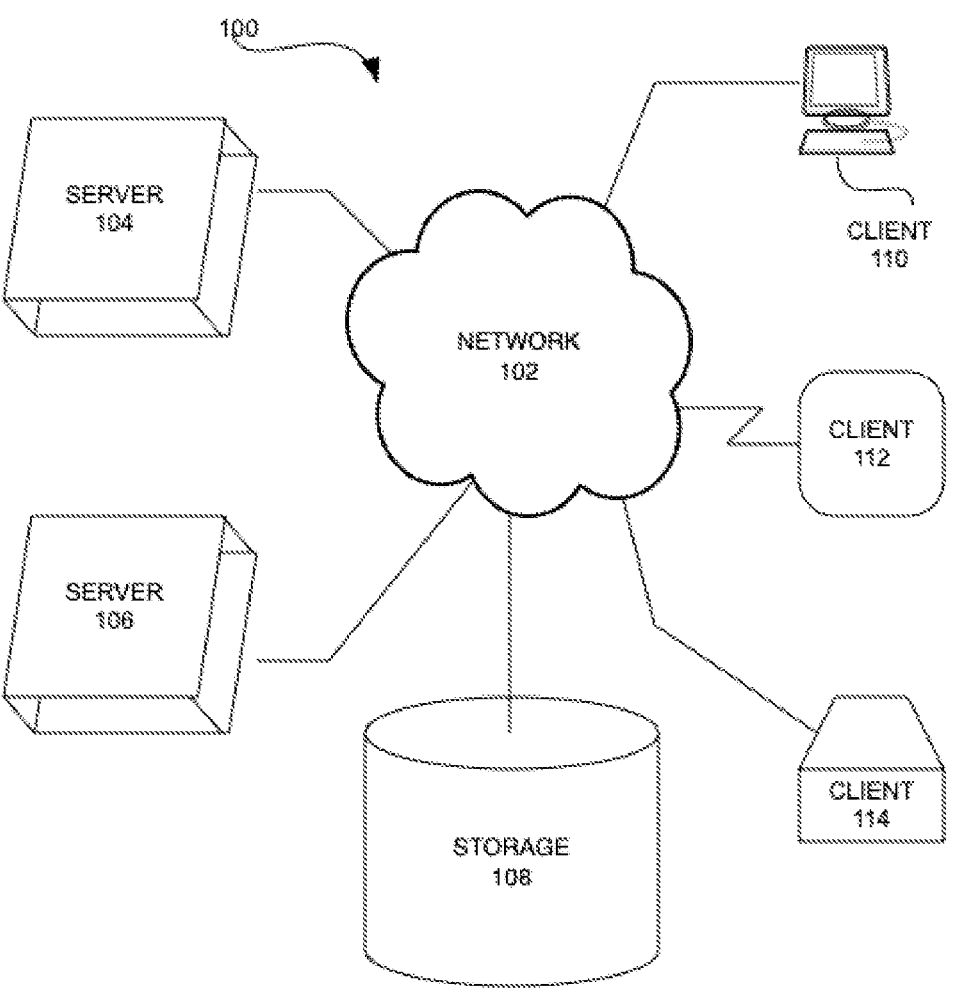

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables. Also, network 102 may be, for example, a private network, a public network, a hybrid network, a corporate network, or the like.

In the depicted example, server 104 and server 106 connect to network 102, along with storage 108. Server 104 and server 106 may be, for example, server computers with high-speed connections to network 102. Also, it should be noted that server 104 and server 106 may represent computing nodes in a cloud environment that manages analysis services for one or more networks and their respective resources. Alternatively, server 104 and server 106 may represent clusters of servers in a data center. Further, server 104 and server 106 may provide information, such as, for example, programs, application, updates, patches, and the like, to the registered client data processing systems.

Client 110, client 112, and client 114 also connect to network 102. In this example, client 110 is shown as desktop or personal computer with wire communication links to network 102. However, it should be noted that client 110 is an example only and may represent other types of data processing systems, such as, for example, a video stream capture, a hub, a credential scanner, an optical scanner, a radio transceiver, a bridge, a laptop computer, handheld computer, smart phone, smart watch, smart television, or the like, with wire or wireless communication links to network 102. A user of client 110 may utilize client 110 to access and utilize the resources and/or services provided by client 112 and client 114. Resources may include, for example, data, documents, software such applications and programs, hardware such as processors, memory, and storage, and the like. Services may include any type of online service, such as, for example, identity services, physical access control services, motor control, storage management, network optimization, version control, network latency reduction, banking services, financial services, governmental services, insurance services, entertainment services, search services, reservation services, and the like. In addition, it should be noted that client 110 may represent a plurality of different client devices corresponding to a plurality of different users.

Clients 112 and 114 are registered clients of server 104 and server 106. In this example, client 112 and client 114 each represents a data processing system, such as a sever computer, that provides the resources and services of network 102. Further, it should be noted that client 112 and client 114 may each represent a plurality of data processing systems corresponding to one or more organizations, enterprises, institutions, agencies, and the like.

Storage 108 is a network storage device capable of storing any type of data in a structured format or an unstructured format. In addition, storage 108 may represent a plurality of network storage devices. Further, storage 108 may store identifiers and network addresses for a plurality of different network security servers, identifiers, and network addresses for a plurality of different registered client devices, identifiers for a plurality of different users, and the like. Furthermore, storage unit 108 may store identities, IP and URL addresses, policies, and the like. Moreover, storage unit 108 may store other types of data, such as authentication or credential data that may include user names, passwords, images, and biometric data associated with network users, system administrators, and security analysts, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on network security server 104 and downloaded to client 112 over network 102 for use on client 112.

In the depicted example, network data processing system 100 may be implemented as a number of different types of communication networks, such as, for example, the Internet, an intranet, a local area network, a wide area network, a telecommunications network, or any combination thereof. FIG. 1 is intended as an example only, and not as an architectural limitation for the different illustrative embodiments.

Figure 2:
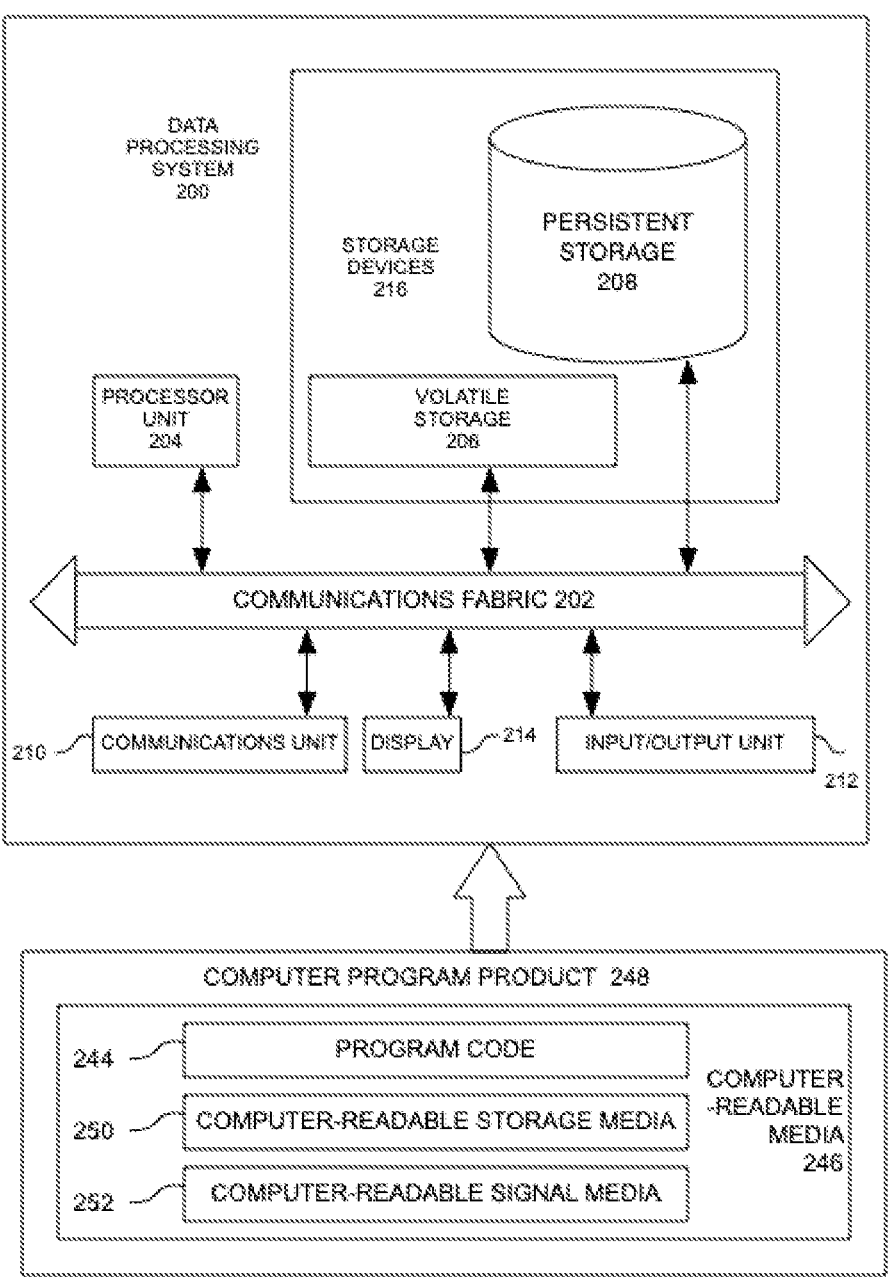

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, volatile storage 206, persistent storage 208, communications unit 210, input/output unit 212, and display 214.

Processor unit 204 serves to execute instructions for software applications and programs that may be loaded into volatile storage 206. Processor unit 204 may be a set of one or more hardware processor devices or may be a multi-core processor, depending on the particular implementation.

Volatile storage 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Volatile storage 206, in these examples, may be, for example, a random-access memory, or any other suitable non-transitory storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into volatile storage 206 for running by processor unit 204. The processes of the different embodiments may be performed by processor unit 204 using computer-implemented instructions, which may be located in a memory apparatus, such as volatile storage 206. These program instructions are referred to as program code, computer usable program code, or computer readable program code that may be read and run by a processor in processor unit 204. The program instructions, in the different embodiments, may be embodied on different physical computer readable storage devices, such as volatile storage 206 or persistent storage 208.

Program code 244 is located in a functional form on computer readable media 246 that is selectively removable and may be loaded onto or transferred to data processing system 200 for running by processor unit 204. Program code 244 and computer readable media 246 form computer program product 248. In one example, computer readable media 246 may be computer readable storage media 250 or computer readable signal media 252. Computer readable storage media 250 may include, for example, an optical or magnetic disc that is inserted or placed into a drive or other device that is part of persistent storage 208 for transfer onto a storage device, such as a hard drive, that is part of persistent storage 208. Computer readable storage media 250 also may take the form of a persistent storage, such as a hard drive, a thumb drive, or a flash memory that is connected to data processing system 200. In some instances, computer readable storage media 250 may not be removable from data processing system 200.

Alternatively, program code 244 may be transferred to data processing system 200 using computer readable signal media 252. Computer readable signal media 252 may be, for example, a propagated data signal containing program code 244. For example, computer readable signal media 252 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of nontangible media, such as communication links or wireless transmissions containing the program code.

In some illustrative embodiments, program code 244 may be downloaded over a network to persistent storage 208 from another device or data processing system through computer readable signal media 252 for use within data processing system 200. For instance, program code stored in a computer readable storage media in a data processing system may be downloaded over a network from the data processing system to data processing system 200. The data processing system providing program code 244 may be a server computer, a client computer, or some other device capable of storing and transmitting program code 244.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor or a molecular structure.

As another example, a computer readable storage device in data processing system 200 is any hardware apparatus that may store data. Volatile storage 206, persistent storage 208, and computer readable storage media 250 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, volatile storage 206 or a cache such as found in an interface and memory controller hub that may be present in communications fabric 202.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
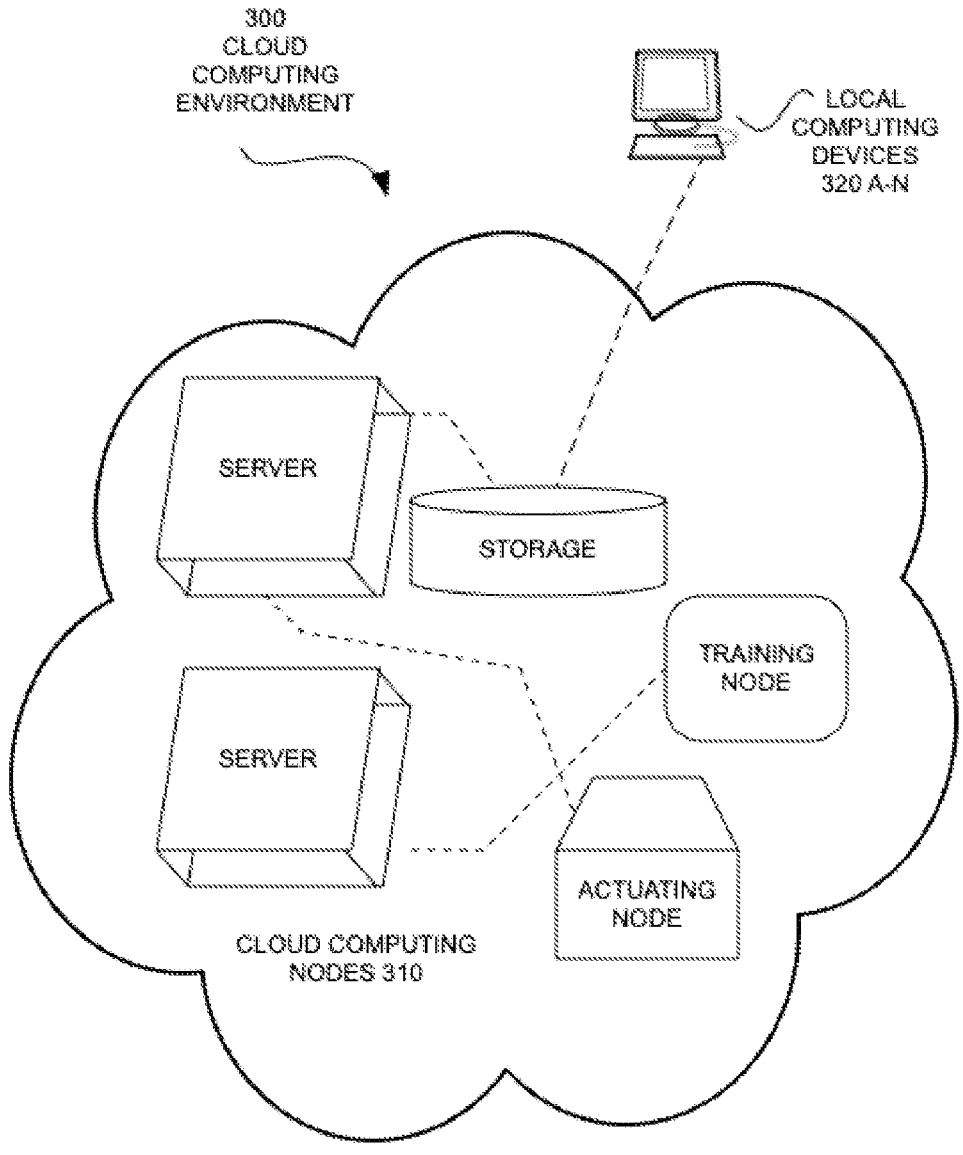

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, local computing device 320A-N may communicate. Cloud computing nodes 310 may be, for example, server 104, server 106, client 112, and client 114 in FIG. 1. A local computing device of local computing devices 320A-320N may be, for example, client 110 in FIG. 1. Local computing devices may be stationary such as sensors and may be mobile such as vehicles, hand-carried, and body-worn/implanted.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-N. It is understood that the types of local computing devices 320A-N are intended to be illustrative only and that cloud computing nodes 310 and cloud computing environment 300 can communicate with any type of computerized device over any type of network and/or network addressable connection using a web browser or Internet Protocol, for example.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, main-frames 410, RISC (Reduced Instruction Set Computer) architecture-based servers 412, servers 414, blade servers 416, storage devices 418, and networks and networking components 420. In some illustrative embodiments, soft-ware components may include, for example, network appli-cation server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 pro-vides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Secu-rity provides identity verification for cloud consumers and tasks, as well as protection for data and other resources. User portal 440 provides access to the cloud computing environ-ment for consumers and system administrators. Service level management 442 provides cloud computing resource allo-cation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and security management 456.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over tech-nologies found in the marketplace, or to enable others of ordinary skill in the art to understand the embodiments disclosed herein.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objec- tives. Acts, elements and features discussed only in connec-tion with one implementation are not intended to be excluded from a similar role in other implementations or implementations.

The phraseology and terminology used herein is for the purpose of description and should not be regarded as lim-iting. The use of "including" "comprising" "having" "con-taining" "involving" "characterized by" "characterized in that" and variations thereof herein, is meant to encompass the items listed thereafter, equivalents thereof, and addi-tional items, as well as alternate implementations consisting of the items listed thereafter exclusively. In one implemen-tation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any imple-mentation or element or act herein may also embrace implementations including only a single element. Refer-ences in the singular or plural form are not intended to limit the presently disclosed systems or methods, their compo-nents, acts, or elements to single or plural configurations. References to any act or element being based on any information, act or element may include implementations where the act or element is based at least in part on any information, act, or element.

Any implementation disclosed herein may be combined with any other implementation, and references to "an imple-mentation," "some implementations," "an alternate imple-mentation," "various implementation," "one implementa-tion" or the like are not necessarily mutually exclusive and are intended to indicate that a particular feature, structure, or characteristic described in connection with the implemen-tation may be included in at least one implementation. Such terms as used herein are not necessarily all referring to the same implementation. Any implementation may be com-bined with any other implementation, inclusively or exclu-sively, in any manner consistent with the aspects and imple-mentations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to providing interactive content for display, the systems and methods described herein can include applied to other environments in which data included in a log database used and compared to data corresponding to previous requests for content and responsive to determining a change in the data, identifying one or more content elements to which to attribute the credit for the change. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system for guaranteed latency real-time vehicle control comprising:

a semiconductor system on a chip having a multi-core processor with at least one general purpose core, a shared memory, a plurality of hardware virtualized cores, a plurality of network interfaces communicatively coupled to the processor cores, internal buses and signal wires interconnecting all the above components for data, signals, and control of policy-driven latency ranges to each of the hardware virtualized cores from the general purpose core;

a variety of real-time and non-real-time operating systems including one or more of RTOS, LINUX and PEAK in the hardware virtualized cores and a range of application channels comprising Observation, Transformation Decision, Acceleration Decision, and Execution, said applications configured to exchange data efficiently through writing and reading from shared memory but to ensure high throughput and guaranteed performance, receiving from a separation kernel, a range of policy-driven latencies prioritized according to their function; and further including a method of operation including the following processes:

instantiating a real-time operating system into a plurality of hardware virtualized cores;

installing a separation kernel operating system into a multi-core electronic control unit processor;

instantiating a plurality of bus interface drivers;

reading from non-transitory media a policy-driven range of guaranteed latency for real-time applications; and distributing to each hardware virtualized core a range of guaranteed latency for bus, memory, and computation according to their function; wherein, the semiconductor system on a chip is further coupled to a vehicle-bus network as a vehicle-bus host;

the vehicle-bus network is further coupled to a plurality of vehicle-bus devices, through at least one vehicle-bus hub; and the vehicle-bus network further coupled to a controller area network (CAN) compatible legacy controller through a controller area network-universal serial bus (CAN-USB) adapter and operated according to a latency-policy driven operating system.

2. The system of claim 1, wherein the plurality of hardware virtualized cores further execute the processes:

reading a stored policy for ranges of guaranteed latency for a maximum delay and a minimum delay for placing each type of real time process;

placing a real-time process in-scope;

evaluating a plurality of real-time metrics to filter out noise and out of range values; and alerting on a condition that a rate of change for a filtered real time metric exceeds a threshold.

3. The system of claim 2, wherein the plurality of hardware virtualized cores further execute the processes:

receiving a policy driven range of guaranteed latency for conversion of universal serial bus (USB) data packets to CAN bus data packets;

within the Observation channel, receiving a USB data packet from a sensor through a first USB bus protocol pipe;

storing the USB data packet into the shared memory;

within the Decision channel, reading the USB data packet from the shared memory and transforming it into a second CAN bus protocol packet; and storing the CAN bus protocol packet into the shared memory within the guaranteed range of latency.

4. The system of claim 3 further comprising the processes;

within the Observation channel, receiving, via a bus, temperature metrics from thermal sensors within at least one bank of batteries;

storing temperature metrics into the shared memory when within an nth range of focused latency;

within the decision channel, reading temperature metrics from the shared memory when within an n−1th range of focused latency and determining the rate of change exceeds a safety threshold;

determining a pattern of battery bank idleness for reducing heat concentration during charging or discharging and storing the pattern into the shared memory; and within the Execution channel, reading the pattern from the shared memory and transmitting commands via a bus to a battery control unit to shift charging and discharging to the new pattern.

5. The system of claim 1, further comprising:

a single engine control unit (ECU) Car;

a Bluetooth-USB interface transceiver;

a set of cameras communicatively coupled over USB for Car;

a Real Time USB for Car;

a central processing unit (CPU) Core Allocation for Vehicle Control;

Entertainment Software Isolation for Car;

a USB Hub for car applications;

a USB battery/capacitor for current surge on Intermittent Load;

electromagnetic Interference (EMI) shielding for intra-car communication by a set of USB cables;

EMI shielding for intra-car communication by a USB Connector;

a Shared Memory Architecture for Car; and

Isolation of one or more time-critical jobs for automotive control.

6. A multi-protocol combined real-time and conventional vehicle bus system comprises:

a multi-core processor device, managed by a hypervisor, comprising a plurality of cores; wherein, at least one processor core of the plurality of processor cores is configured as a general purpose operating system to support a plurality of functional data-driven tasks;

at least one processor core of the plurality of processor cores is configured as a real-time operating system to support a plurality of real-time, event-driven tasks;

a multi-port shared memory accessible to tasks in a real-time operating system and tasks in a general purpose operating system;

wherein the multi-port shared memory comprises a plurality of vehicle bus host sending endpoints and a plurality of vehicle bus host receiving endpoints;

a vehicle bus host controller (VBHC);

at least one peripheral device (pDev) comprising at least one pair of sending and receiving endpoints;

All coupled to the VBHC by a multi-wire media (cable).

7. The system of claim 6, wherein the general purpose operating system core further comprises:

a plurality of virtual machine hosted tasks;

a pipeline of payloads and packets queued for bus transfers, a store of latency and bandwidth policies for each pair of endpoints on the vehicle bus;

a store of relative priorities of virtual machine hosted tasks.

8. The system of claim 6, wherein the real-time operating system core comprises:

a command ring task;

an event ring task;

a plurality of transfer ring tasks; and a plurality of stores for micro-frame pipes.

9. The system of claim 6, wherein the multi-port shared memory comprises:

a hash function and store;

a content addressable store (CAS); and a malware hash store (malhashstore); and wherein peripheral devices also comprises:

a controller area network (CAN) interface;

an Ethernet interface;

a FlexRay interface, and wherein the peripheral devices further comprise:

a hash function;

a content addressable store (CAS);

and a malware hash store (malhashstore).

10. A method of operation of a vehicle bus system comprising:

At a host, sending a task I/O payload into a plurality of packets suitable for a peripheral device;

setting a priority of this task I/O payload relative to all other known tasks' I/O payloads;

setting a latency for a start of a transfer;

setting a desired bandwidth, a transfer size, and a desired deadline for completion;

reading a latency policy from a latency policy store for each endpoint;

configuring a pseudo-random module to provide polling that achieves the latency policy for an endpoint in a peripheral device;

enqueuing a sequence of polling transactions into a command ring to determine a readiness state of endpoints in the peripheral device pseudo-randomly according to the latency policy;

receiving a peripheral device endpoint "ready" state in an event ring;

when the endpoint is "ready", enqueuing a transaction into a transfer ring scheduled by the priority, the bandwidth, the transfer size, and the desired deadline for completion;

receiving the payload into a receiving endpoint in the multiport shared memory;

transmitting the payload to the receiving endpoint;

notifying a host task that the payload is available in the receiving endpoint;

adjusting the latency policy in the latency policy store according to one or more host task requirements;

storing the I/O payload into a sending endpoint within the multi-port shared memory;

writing transaction indicia into a command ring;

receiving a status from an event ring;

reading the plurality of packets from a receiving endpoint within the multi-port shared memory; and reassembling the I/O payload from the plurality of packets sent from the peripheral device.

11. The method of claim 10, further comprising:

at a host, reading a band-width policy store for each pair of endpoints;

assigning one or more micro-frames according to minimum data rate;

assigning one or more transactions according to the transfer size;

queuing the one or more transactions according to the desired deadline for completion;

inserting the one or more transactions into the transfer ring;

polling one or more peripheral devices for endpoint readiness;

initiating a transfer between a host endpoint and a peripheral endpoint;

receiving a status on the event ring; and transferring data between the multi-port shared memory and a host task.

12. The method of claim 10, further comprising:

determining when a payload is already in a content addressable store (CAS);

on the condition that a payload is not already in the CAS:

storing the payload into the content addressable store (CAS); or on the condition that the payload is already in the CAS computing a hash of the payload; and replacing the payload in the sending endpoint with its hash.

13. The method of claim 12, further comprising;

storing a hash of malware into a malware hash store (malhashstore);

comparing a packet in the receiving endpoint with the hash of malware; and when the packet received at the receiving endpoint equals the hash of malware disconnecting the peripheral device from the network.

14. The method of claim 10, further comprising:

at the peripheral device:

receiving a packet from an attached satellite bus;

transforming the packet from the attached satellite bus into a vehicle-bus payload;

loading the vehicle-bus payload into the sending endpoint of the peripheral device;

computing a hash of the vehicle-bus payload;

determining when the hash of the vehicle-bus payload matches a hash stored in a content addressable store (CAS);

determining when the hash of the vehicle-bus payload matches a hash stored in a malware hash store (malhashstore);

replacing the payload with the hash found in the CAS or the malhashstore when matched;

storing the sending endpoint ready state into a control endpoint; and, responding to send signal from host by transmitting from the sending endpoint to a host receiving endpoint.

15. The system of claim 6, wherein the at least one processor core of the plurality of processor cores is configured as a general-purpose operating system to support:

at least one of a programmable pseudo-random number generator module to direct endpoint polling according to a latency policy set by the task of the host;

a hash function;

a content addressable store and a malware hash store.

* * * * *